United States Patent [19]

Zoumut

[11] 4,184,888
[45] Jan. 22, 1980

[54] EFFERVESCENT ADHESIVE-FORMING PRODUCT

[75] Inventor: Hani F. Zoumut, Xenia, Ohio

[73] Assignee: DAP Inc., Dayton, Ohio

[21] Appl. No.: 882,534

[22] Filed: Mar. 1, 1978

[51] Int. Cl.² .......................... A61K 9/46; C08L 1/26
[52] U.S. Cl. ................................. 106/178; 106/194; 424/44; 428/534
[58] Field of Search ....................... 106/178, 194, 122; 424/44; 252/7

[56] References Cited

U.S. PATENT DOCUMENTS

| 2,298,187 | 10/1942 | Woodhouse | 252/7 |
| 2,985,562 | 5/1961 | Millard et al. | 424/44 |
| 3,444,290 | 5/1969 | Kee-Neng Wai | 424/44 |
| 3,653,914 | 4/1972 | Schmitt | 424/44 |
| 3,690,938 | 9/1972 | Swift | 106/197 |
| 3,887,700 | 6/1975 | Boncey | 424/44 |
| 3,891,509 | 6/1975 | Warren et al. | 252/7 |
| 3,930,032 | 12/1975 | Harris et al. | 106/194 |
| 3,944,660 | 3/1976 | Guttfried | 424/44 |

*Primary Examiner*—Theodore Morris
*Attorney, Agent, or Firm*—Barbara L. C. Renda; Mary S. King; Bruce M. Eisen

[57] ABSTRACT

An effervescent product useful for forming a holding adhesive, especially a wall covering adhesive, is disclosed herein.

9 Claims, No Drawings

EFFERVESCENT ADHESIVE-FORMING PRODUCT

BACKGROUND OF THE INVENTION

The present invention relates to an adhesive-forming product. More particularly, it relates to an effervescent article of manufacture which, when mixed with water, is suitable for use as a holding adhesive, especially as a wall covering adhesive. The wall coverings for which this invention are especially suited are wall papers, including the vinyl-coated and fabric-backed varieties. Other sheet materials for which the adhesive-forming composition are useful include paper, cardboard, fabric and the like.

Adhesive products for adhering these types of wall coverings have classically been formulated from such natural sources as starch, dextrin, gum arabic, gum tragacanth and certain modified casein or other animal protein bases. Most are dispersed as powders in water and develop, after application, their strength by drying. In recent years such adhesive products have been formulated with synthetic polymers to provide enhanced water resistance.

Adhesive products suitable for use as wall covering adhesives are designated as holding adhesives, i.e., adhesives that are intended primarily for merely attaching one adherent to another and holding it in place without requiring any significant resistance to external stressing. The working properties of such a holding adhesive product include characteristics that influence application, such as mixing, spreading, pressing, curing, speed of curing or rate of strength development and convenience of cleaning up afterwards. Heretofore, commonly available wall covering adhesive products have been messy and inconvenient to formulate and clean up. The packages of dry powder wall covering adhesive products commonly sold afford batches of a wall covering adhesive sufficient to paste an average size room. Scaling down to a smaller batch of the adhesive involves measuring the contents of the package, deciding how much is needed, and then mixing the required amount of dry powder with the proper amount of solvent. Thus, a worker requiring only a small amount of the adhesive usually wastes a substantial amount of the adhesive by premixing the entire package in order to avoid this bothersome procedure. Available dry powder adhesive products (which are non-effervescent in nature) also suffer from the disadvantage that they are inconvenient to mix in either small or large batches due to the lumping, caking and stickiness that are characteristic of the resultant mixture of dry powder and water. Preparing a lump-free paste mixture often involves portionwise addition of the dry powder to the volume of water coupled with vigorous and continuous stirring.

SUMMARY OF THE INVENTION

This invention provides convenient, easy-to-mix and easy-to-measure product which, when dispersed in water, is useful as a holding adhesive especially as a wall covering adhesive. It provides an article of manufacture which may be conveniently mixed with water and in either small or large batches. This composition, when contacted with water, will readily disperse and thus minimize the need for messy and inconvenient mixing.

DETAILED DESCRIPTION OF THE INVENTION

It has surprisingly been found that one can selectively formulate an adhesive base and a compatible effervescent source to provide a stable product from which it is easy and quick to prepare a homogenous holding adhesive solution. One might have anticipated that an adhesive base would, upon dropping in water, form a gelatinous mass from which it would be difficult and time consuming to form a homogenous solution. However, I have found that the combination of a selected adhesive base with an effervescent source provides the mixture force necessary to afford a homogenous solution. The effervescent composition may be packaged as a premeasured powdered mixture or alternatively, compressed into a tablet form. The effervescent product of the present invention is an article of manufacture which comprises by weight:

20–50% of a water-soluble polymeric adhesive base;
45–80% of a compatible effervescent source consisting essentially of an acid component and a carbonating component whereby the acid component and carbonating component are present in amounts sufficient to afford a water solution of approximately pH 3.5–9.5.

A preferred effervescent product in powdered form of this invention comprises by weight:

30–50% of a water-soluble polymeric adhesive base; and
50–70% of a compatible effervescent source consisting essentially of an acid component and a carbonating component whereby the acid component and carbonating component are present in amounts sufficient to afford a water solution of approximately pH 3.5–9.5.

Another preferred embodiment of the present invention is a tableted form which by weight comprises:

25–40% of a water-soluble cellulosic adhesive base;
20–30% of a compatible acid component;
30–40% of a compatible carbonating component; and
1–2% of an anhydrous solvent which is water miscible and in which the adhesive base is substantially insoluble and non-swelling.

In a preferred effervescent product of this invention the adhesive base is hydroxyethyl cellulose, and the effervescent source consists essentially of citric acid and sodium carbonate.

The adhesive base of this composition is the component which is primarily responsible for the adhesive forces which hold the one adherent to the other. Suitable water-soluble polymeric adhesives are those such as the starches, e.g., corn, tapioca and sago, dextrins and the water-soluble celluloses, such as hydroxyethyl cellulose, hydroxypropyl cellulose, methyl cellulose and ethyl-hydroxyethyl cellulose. A preferred water-soluble, cellulosic adhesive base for use in this invention is hydroxyethyl cellulose having a degree of substitution from 1.5 to 3.0. A suitable hydroxyethyl cellulose source are those commercial preparations sold under the tradename Natrosol (by Hercules Chemical Co.), and especially Natrosol 250.

The compatible effervescent source embodied in the present invention refers to compositions capable of liberating carbon dioxide in the form of bubbles when placed in an aqueous media, thereby producing the effervescence, and which do not chemically react with the other components of the composition. Effervescent compositions capable of generating carbon dioxide are thus composed of a solid source of carbon dioxide, such as a carbonate and/or bicarbonate, in combination with an organic or inorganic acid which, upon contact with water, react to liberate carbon dioxide in the form of bubbles. The acid component may constitute a single acidic material or a combination of solid acid substances. Typical acid components include citric acid, tartaric acid, malic acid, succinic acid, fumaric acid and combinations thereof. The carbonating component usually takes the form of a carbonate or a bicarbonate, or any mixture thereof. More preferably, the carbonating component will be a non-toxic salt of carbonic acid in any of its forms, and most preferably one of the alkali metal carbonates or bicarbonates, e.g., sodium carbonate or sodium bicarbonate. The acid component and the carbonating component are present in the composition in such amounts so as to produce a solution having a pH of 3.5–9.5 when the composition is mixed with water. By adjusting the amounts of the acid and carbonating components it is possible to control the speed of dissolution of the product, i.e., by adding more carbonating component and making the pH more basic; or the "stickiness" of the adhesive, i.e., by adding more acid component and making the pH more acidic. Thus, to afford a product for heavier materials, a product having a greater percentage of acid component is added to afford better adhesion. For faster dissolution where the adhesive is for light materials such as paper, the product will contain more carbonating component.

Optionally, an anhydrous solvent may be employed to facilitate tableting when the product is in tableted form. When used, it may be any of a number of commonly used solvents which are water miscible and in which the water-soluble adhesive base is substantially insoluble and which does not cause the polymeric adhesive base to swell. Preferred solvents are the lower alkanols, such as anhydrous ethyl alcohol and anhydrous isopropyl alcohol. Anhydrous isopropyl alcohol is most preferred for use in this invention. Other solvents which also may be used are those in which the water-soluble adhesive base is not soluble and which does not cause swelling, such as the higher alkanols, ketones, diethylene glycol monoethyl ether, diethylene glycol momoethyl ether, ethylene glycol monobutyl ether acetate and hexylene glycol.

To further facilitate tableting, a conventional tableting binder may optionally be employed. It should be soluble in the foregoing anhydrous solvent and inert to the other components of the mixture. Suitable binders include gum acacia, gelatin, gum tragacanth, guar gum, sodium carboxymethyl cellulose, ethyl cellulose, hydroxypropylmethyl cellulose, starch glucose or a carboxypolymethylene polymer (carbomer). The tableting binder is preferably water soluble. The carboxypolymethylene polymers, or carbomers (CTFA Cosmetic Ingredient Dictionary 1973), are preferred tableting binder agents for use in this invention. Those resins consist essentially of a colloidally water-soluble polymer of acrylic acid crosslinked with from 0.72 to 2% of a crosslinking agent selected from the class consisting of polyalkyl sucrose and polyallyl pentaerythritol. Suitable carboxypolymethylene polumers, or carbomers, are those marketed under the tradename of Carbopol resins by the B. F. Goodrich Company. A preferred polymer is the carbomer 934, which is a water-soluble polymer of acrylic acid crosslinked with about 1% of a polyallyl ether of sucrose having an average of about 5.8 allyl groups for each molecule of sucrose and having a molecular weight of about 3,000,000.

Thus, in the embodiment wherein a tableting binder is used, the adhesive base must be insoluble in the chosen anhydrous solvent while the tableting binder must be soluble in the anhydrous solvent and the latter must be water-miscible.

The products of the invention are conveniently manufactured by well-known methods and are packaged in sizes so as to provide a convenient quantity of wall-covering adhesive when the contents of the package are dissolved in water. This quantity is preferentially from about 2 oz.–8 oz. which affords about 1 qt.–1 gal. of mixed adhesive. For the purpose of this specification, the term "tablets" covers pellets, briquettes and similarly formed shapes. The dry base is blended with the effervescent source until uniformly mixed and then moistened with the solution of the tableting binder in the anhydrous binder solvent. The mixture is then compressed into the desired shape on a tableting machine and packaged.

The compositions of the present invention may optionally incorporate conventional water-soluble preservatives and mildewcides. More particularly, when a cellulose derivative is used as the adhesive base, a preservative may be added to insure stability and enhance shelf-life for the product. The use of a preservative additionally serves to inhibit mildew and mold growth on the applied adhesive. Suitable preservatives include, but are not limited to, chlorinated phenols, hydroxyquinoline, parahydroxybenzoates (methyl, propyl, heptyl, etc.), phenylmecuric salts (acetate, nitrate, etc.), sodium benzoate and sorbic acid. Such preservatives and/or mildewcides are usually present in an amount of about 0.01–5% by weight, depending on the particular agents utilized.

The finished tablets, pellets or briquettes of this invention are preferably packaged in hermatically sealed, moisture-proof containers, e.g., cellophane (cellulose acetate); polyethylene polyvinyl resin or foil wrappers, or covered with a suitable plastic film to protect them from atmospheric moisture prior to consumer use.

When the composition is left in powdered form without tableting, it is preferably similarly packaged in premeasured, hermatically-sealed, moisture-proof pouches.

Suitable packages are those such as described in U.S. Pat. No. 3,057,467.

SPECIFIC EMBODIMENTS OF THE INVENTION

The following examples describe in detail compositions illustrative of the present invention. It will be apparent to those skilled in the art that many modifications, both of materials and methods, may be practiced without departing from the purpose and intent of this disclosure.

EXAMPLE 1

A powdered composition suitable for use as a wall covering adhesive when mixed with water is prepared from the following:

| Component | Percent by Weight |
|---|---|
| Hydroxyethyl cellulose (Natrosol HBR) | 40 |
| Sodium carbonate | 36 |

| Component | Percent by Weight |
|---|---|
| Citric acid | 24 |

Blend together the above ingredients in powder mixing equipment, e.g., a P.K. Blender or a Ribbon mixer, then package in hermatically-sealed, moisture-proof pouches.

EXAMPLE 2

A tablet suitable for use as a wall covering adhesive when mixed with water is prepared from the following:

| Component | Percent by Weight |
|---|---|
| Hydroxyethyl cellulose (Natrosol 250) | 33.9 |
| Sodium carbonate | 37.3 |
| Citric acid | 27.0 |
| Anhydrous isopropyl alcohol | 1.8 |

Blend together in a P.K. Blender equipped with a liquid feeder the hydroxyethyl cellulose, sodium carbonate and citric acid until uniformly mixed. Then feed the anhydrous isopropyl alcohol into the mixer. When the powders are uniformly moistened, feed the mixture into a tablet machine hopper for compacting into 50–60 gram tablets. The finished tablets are packaged in moisture-proof cellophane packages for shipping.

EXAMPLE 3

A tablet suitable for use as a wall covering adhesive when mixed with water is prepared from the following:

| Component | Percent by Weight |
|---|---|
| Hydroxyethyl cellulose (Natrosol 250) | 28.57 |
| Sodium carbonate | 34.28 |
| Citric acid | 22.86 |
| Anhydrous isopropyl alcohol | 14.15 |
| Carbomer 934 | 0.14 |

Blend together the hydroxyethyl cellulose, sodium carbonate and citric acid in powder mixing equipment such as a P.K. Blender equipped with a liquid feeder. Blend until the chemical powders are uniformly mixed. Dissolve the carbomer 934 in anhydrous isopropyl alcohol and feed the solution into the mixer. When the powders are uniformly moistened with alcohol solution, feed the mixture into a tablet machine hopper for compacting into 50–60 gram tablets and packaging. The finished tablets are packaged in moisture-proof cellophane packages for shipping.

A 60 gram tablet prepared as above is dropped into one quart of room temperature tap water. The mixture is allowed to stand until dissolution is complete, stirred thoroughly once, and is then ready for use as a wallpaper adhesive.

When used to apply regular wallpaper, this adhesive composition exhibit "good" adhesion strength after one day and "good" adhesion strength after 10 days. "Good" adhesion strength denotes that the adhesion is very strong and that the test sample cannot be removed intact upon peeling from the substrate.

EXAMPLE 4

A tablet is prepared as in Example 2 using the following:

| Component | Percent by Weight |
|---|---|
| Hydroxyethyl cellulose (Natrosol 250) | 28.57 |
| Sodium carbonate | 14.28 |
| Citric acid | 42.87 |
| Anhydrous isopropyl alcohol | 41.14 |
| Carbomer 934 | 0.14 |

A 60 gram tablet of this composition is dissolved as in Example 1 and used to apply test samples of vinyl-coated wallpaper to a latex-covered dry wall. "Good" adhesion strength was exhibited by this composition when the test samples were 1 and 10 day old. When used to apply fabric-backed vinyl-coated wallpaper, the composition exhibited "fair" adhesion strength after 1 to 10 days. "Fair" adhesion strength indicates that the adhesion is adequate, but that the test sample can be removed intact upon peeling from the substrate.

What is claimed is:

1. An article of manufacture adapted to prepare a holding adhesive solution comprising a hermatically-sealed, moisture-proof package containing a premeasured amount of a composition comprising:
   20–50% of a water-soluble polymeric adhesive base; and
   45–80% of a compatible effervescent source consisting essentially of an acid component and a carbonating component
whereby the acid component and the carbonating component are present in amounts sufficient to afford a water solution of approximatley pH 3.5–9.5.

2. An article of manufacture according to claim 1 in powdered form which by weight comprises:
   30–50% of a water-soluble polymeric adhesive base; and
   50–70% of a compatible effervescent source consisting essentially of an acid component and a carbonating component
whereby the acid component and the carbonating component are present in amounts sufficient to afford a water solution of approximately pH 3.5–9.5.

3. An article of manufacture according to claim 1 in tablet form which by weight comprises:
   25–40% of a water-soluble cellulosic adhesive base;
   20–30% of an acid component;
   30–40% of a carbonating component; and
   1–2% of an anhydrous solvent which is water-miscible
and in which the adhesive base is substantially insoluble and non-swelling.

4. An article of manufacture according to claim 1 wherein the adhesive base is hydroxyethyl cellulose.

5. An article of manufacture according to claim 1 wherein the acid component and carbonating component are citric acid and sodium carbonate, respectively.

6. A tablet according to claim 3 wherein the anhydrous solvent is anhydrous isopropyl alcohol.

7. An article of manufacture according to claim 1 wherein a preservative and/or mildewcide is added.

8. An article of manufacture according to claim 1 wherein the premeasured amount is 2 to 8 oz.

9. A method of adhering wallpaper or the like to a surface which comprises adding a composition of the formula of claim 5 to a suitable quantity of water and applying the resultant adhesive to the wallpaper or the like.

* * * * *